(12) United States Patent
Murtagh

(10) Patent No.: US 6,564,881 B2
(45) Date of Patent: May 20, 2003

(54) MIXING HOE AND BLADE

(76) Inventor: John P. Murtagh, 119 Queensgate La., Charlotte, NC (US) 28214

( * ) Notice: Subject to any disclaimer, the term of this patent is extended or adjusted under 35 U.S.C. 154(b) by 0 days.

(21) Appl. No.: 10/080,572

(22) Filed: Feb. 25, 2002

(65) Prior Publication Data

US 2002/0112865 A1 Aug. 22, 2002

Related U.S. Application Data

(63) Continuation-in-part of application No. 09/633,972, filed on Aug. 8, 2000, now abandoned.

(51) Int. Cl.$^7$ .................................................. A01B 1/06
(52) U.S. Cl. ...................................................... 172/371
(58) Field of Search ............................... 172/371, 375, 172/380, 377, 765; 37/284, 285; D8/10, 11; 30/171; 7/114, 116

(56) References Cited

U.S. PATENT DOCUMENTS

| | | | | |
|---|---|---|---|---|
| 97,863 A | * | 12/1869 | Billings | 172/375 |
| 158,373 A | * | 1/1875 | Green | 172/375 |
| 565,379 A | * | 8/1896 | Dickson | 172/371 |
| 709,903 A | * | 9/1902 | Harper | 172/375 |
| 775,701 A | * | 11/1904 | Coston | 172/375 |
| 865,150 A | * | 9/1907 | Anderson | 172/371 |
| 917,144 A | * | 4/1909 | Ruffin | 172/372 |
| 932,872 A | * | 8/1909 | King | 172/160 |
| 1,037,590 A | * | 9/1912 | Bush | 172/380 |
| 1,075,442 A | * | 10/1913 | Rowley | 172/371 |
| 1,197,530 A | * | 9/1916 | Morris | 172/371 |
| 1,286,779 A | * | 12/1918 | Rhomberg | 172/371 |
| 1,335,006 A | * | 3/1920 | Maultsby | 172/375 |
| 1,387,883 A | * | 8/1921 | Clark | 172/371 |
| 1,545,229 A | * | 7/1925 | Bartran | 172/371 |
| 1,629,900 A | * | 5/1927 | Youngman | 15/104.068 |
| 1,778,773 A | * | 10/1930 | Reynolds | 172/375 |
| 1,954,250 A | * | 4/1934 | Lee | 172/375 |
| 1,987,846 A | * | 1/1935 | Connor | 172/375 |
| 2,245,692 A | * | 6/1941 | Lamb | 172/378 |
| 2,406,280 A | * | 8/1946 | Beneke | 172/375 |
| 2,752,839 A | * | 7/1956 | Robertson | 172/375 |
| D227,258 S | * | 6/1973 | Baty | D14/387 |
| 4,549,611 A | * | 10/1985 | Mills | 111/99 |
| 4,564,072 A | * | 1/1986 | Corbett | 172/13 |
| 4,730,680 A | * | 3/1988 | Indzeoski | 172/375 |
| 4,890,679 A | * | 1/1990 | Jacobs | 172/371 |
| D341,070 S | * | 11/1993 | Warren | D8/11 |
| 5,628,370 A | * | 5/1997 | Chrysler | 172/370 |
| 5,934,800 A | * | 8/1999 | Bonacci | 366/213 |

* cited by examiner

Primary Examiner—Robert E. Pezzuto
Assistant Examiner—Kristine Florio
(74) Attorney, Agent, or Firm—Clyde I. Coughenour

(57) ABSTRACT

A mixing hoe including an elongated handle and a hoe blade attached to the handle is adapted for mixing material in a walled container. The blade forms a bottom edge, opposing upper edge, and first and second opposing side edges. The upper edge has adjacent edge sections extending outwardly and downwardly, from a central recess or opening in the blade upper edge, to respective first and second side edges. The upper edges are bent backward for creating flow patterns. The first and second side edges extend downwardly and inwardly from the upper edge sections outer extremes to the bottom edge. The edges are sloped and the edge corners are rounded to closely resemble container corner and wall characteristics. The blade is manipulated by a user grasping the handle to position at least one of the five scraping edges (two top, two side and bottom) against the base and walls of the container to scrape away material adhering to the base and walls of the container during mixing.

20 Claims, 6 Drawing Sheets

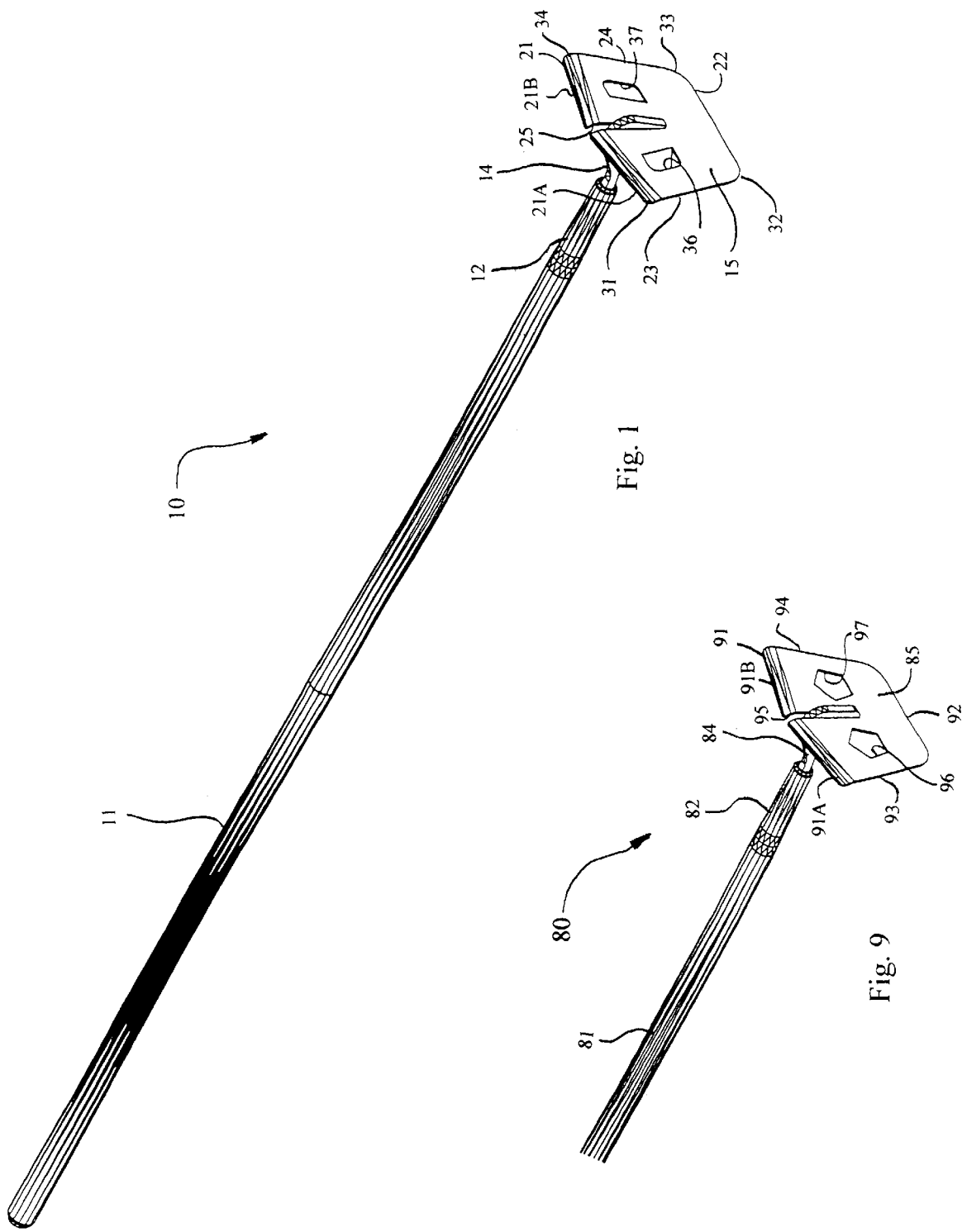

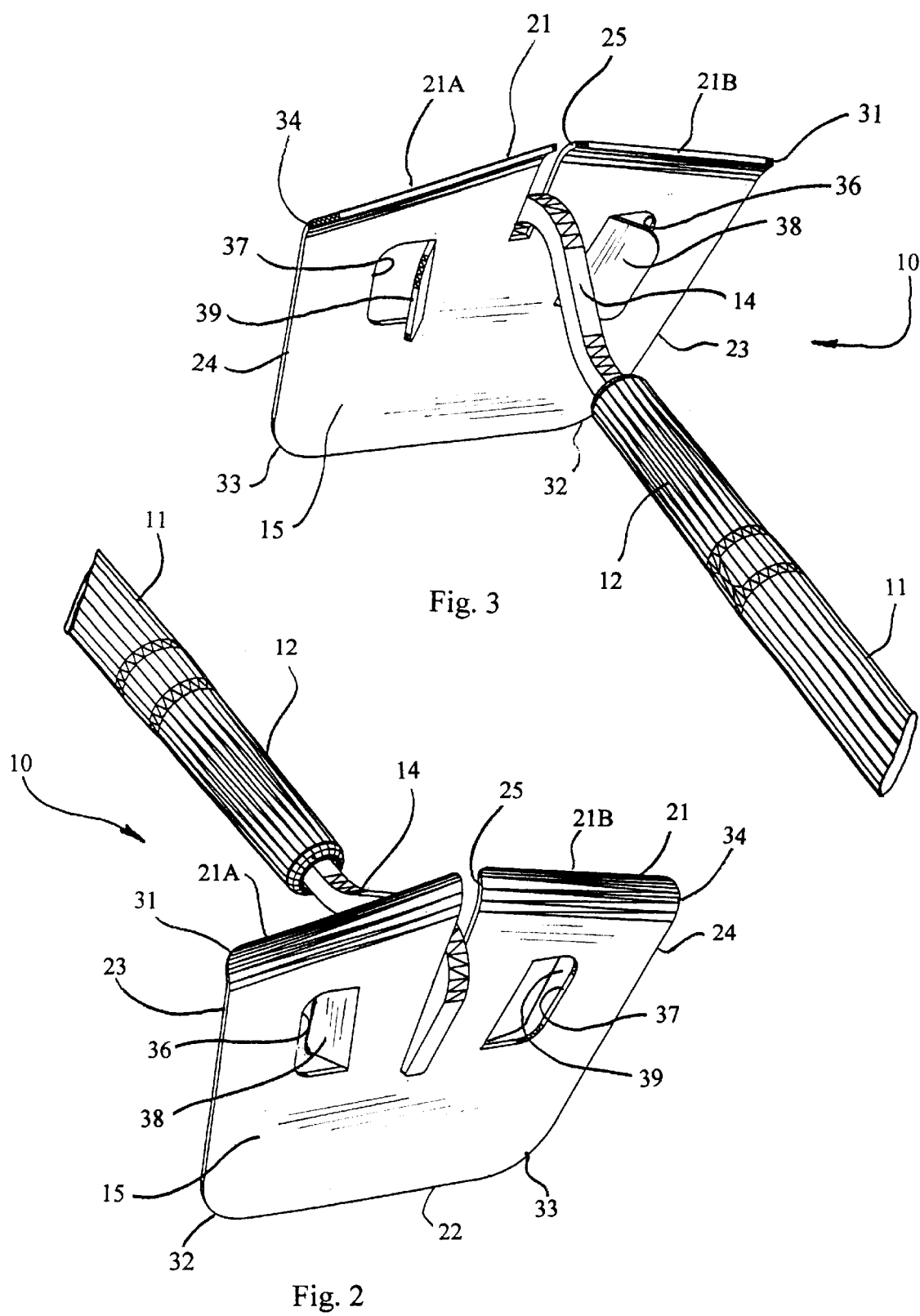

MIXING HOE AND BLADE

RELATED APPLICATION

This application is a Continuation-In-Part of U.S. patent application Ser. No. 09/633,972, filed Aug. 8, 2000 that is now abandoned.

BACKGROUND OF THE INVENTION

1. Field of the Invention

A mixing hoe, for mortar and other construction material in a container such as a wheel barrow or open mixing container, is provided with rounded corners and angled or contoured sides and is provided with openings in it to efficiently mix construction material without damaging the container or leaving volumes of construction material unmixed.

2. Description of Related Art

It is generally common practice in the construction industry and for do-it-yourself handymen to mix mortar in a wheel barrow or open container. While some users have found the standard garden hoe to be a convenient and adequate tool for mixing, these hoes suffer from many drawbacks and limitations. As the basic structure of the mixing hoe has gone through little change over the past 100 years, due consideration must be given to the progressive design of the wheel barrow and its material construction.

It is common to form a pile or heap of powder material such as a concrete, sand, etc., mix from a packet or bag in a container, pour in a liquid, usually water, and mix in the water with the powder. This process is repeated until the proper liquid mix proportion is reached. Less liquid or too little will not form a uniform pasty mix and too much will weaken and make the mix too fluid. The usual problem encountered is in getting the last powder remnants from the corners, sides, end and bottom of the receptacle where it tends to adhere and coagulate without properly mixing with the liquid. Without proper mixing of all the material there will be some areas where there is too much liquid and others where there is too little. Both result in a weakened structure.

Prior art mortar mixing hoes, such as those described by W. Wickson, in U.S. Pat. No. 565,379, issued Aug. 4, 1896 and N. Anderson, U.S. Pat. No. 858,150, issued Sep. 3, 1907 have sharp pointed corners and distinctly angled edges. For the early wooden and metal wheel barrows with generally perpendicular side walls, these hoes were used quite effectively for mixing construction materials. However, primarily through the use of synthetic materials such as plastic, fiberglass, and acrylics, the overall design of the wheel barrow has changed to include integrally-molded, contoured side walls with relatively soft surfaces. The use of conventional prior art mortar mixing hoes in these modern wheel barrows, has proven to be awkward and even destructive. The conventional mixing hoe is generally difficult to manipulate to effectively scrape away mortar adhering to the corners and contoured walls of the wheel barrow or open container during mixing. Moreover, sharp corners of mixing blades tend to gouge, rip, cut, and sometimes puncture the relatively soft surfaces of the wheel barrow and open mixing containers now in use.

SUMMARY OF THE INVENTION

A mixing hoe is designed to be used with weaker, softer modern material containers, such as open top mixing containers and wheel barrows, having rounded corners and sloping side walls. The hoe has a top recessed opening for attachment or placement of a handle to the front or back side of the blade centrally of the hoe blade so as to center or balance the center of gravity and forces exerted during use and to provide equal access to both top edges of the blade, for independent use, as well as the bottom and side edges. The handle intersects the blade at an angle of 70 to 85 degrees with the top side of the blade for flat side horizontal movement through construction material. The edges are blunt and outer corners are all rounded to prevent the mixing hoe from gouging, ripping, cutting and punching the inside surfaces of the container or wheel barrow during mixing.

Different angles between the blade bottom edge and side edges and between the top and sides and between the top edges and recess allows the mixing hoe to engage the bottom and sides of the different containers to scrape off material adhering to these surfaces and corners by a simple rotation of the mixing hoe handle, regardless of the configuration and angles of the container walls. The blade edges are angled so that the flat bottom edge extended intersects the flat side edges extended at an angle in excess of 90 degrees and the side edges extended intersect the top edges extended at an angle of essentially 90 degrees. The opposing top and bottom edges and opposing side edges give ready access to the left and right sides of container walls with little movement by the user necessary. One or more flow ports are provided within the blade to allow limited flow passage therethrough, and flow deflectors are provided adjacent the flow ports to direct and agitate material passing through the flow ports. The top edge of the blade is curved in the direction of the handle to direct material, and in particular liquid, flow during mixing.

BRIEF DESCRIPTION OF THE DRAWINGS

FIG. 1 is a perspective view of a mixing hoe according to one embodiment of the invention.

FIG. 2 is an enlarged, fragmentary front perspective view of the mixing hoe of FIG. 1.

FIG. 3 is an enlarged, fragmentary rear perspective view of the mixing hoe of FIG. 1.

FIG. 9 is a fragmentary perspective view of a mixing hoe according to a third embodiment of the present invention.

DESCRIPTION OF THE PREFERRED EMBODIMENTS

Figure 4:
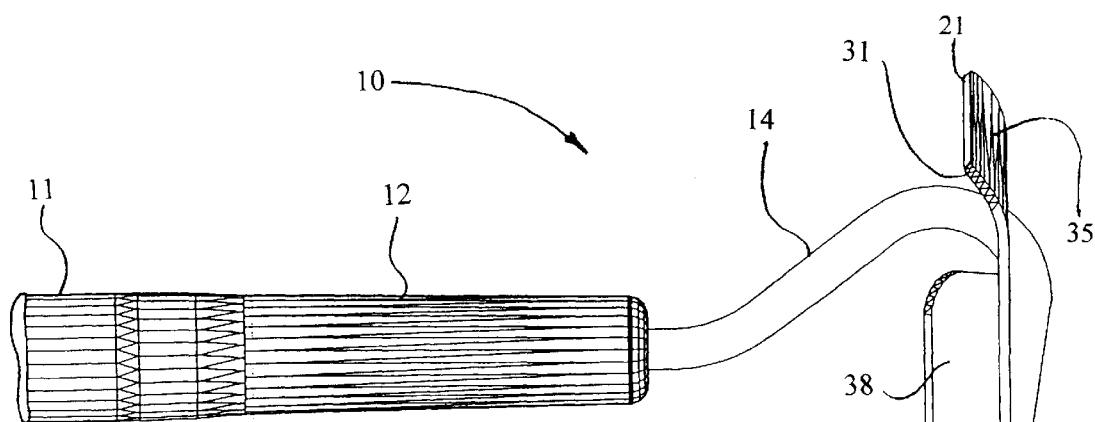
FIG. 4 is an enlarged, fragmentary side elevation view of the nixing hoe of FIG. 1.
Figure 5:
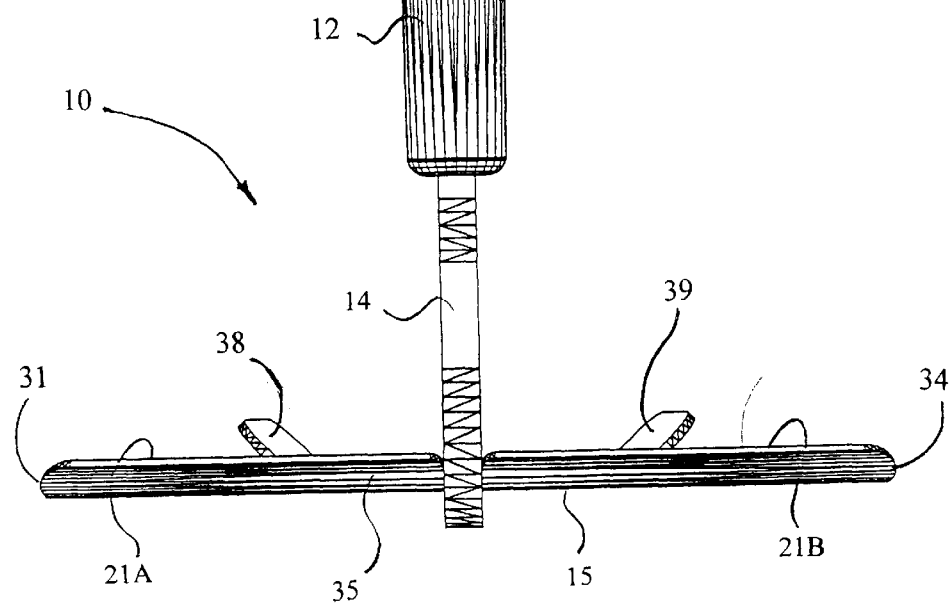
FIG. 5 is an enlarged, fragmentary top plan view of the mixing hoe of FIG. 1.

Referring now specifically to the drawings, a mixing hoe 10 according to the present invention is illustrated in FIG. 1. The mixing hoe 10 is especially applicable for mixing construction material, such as mortar, in a container having a bottom with contoured side walls, such as a conventional wheel barrow. With the present mixing hoe, a user can effectively and thoroughly mix material in any of the presently used containers with reduced effort in less time and without damaging the bottom and side walls of the container. It is ideal for homeowners and craftsmen requiring limited amounts of material and for complimenting other mixing methods such as reworking drum mixed mortar, that has become too stiff, or mixing quick-set cement that sets rapidly and must often be reworked before use.

As shown in FIGS. 1–5, the mixing hoe 10 includes a standard elongate handle 11 having a free end, for being grasped by a user, and a proximal end including a metal ferrule 12 and mounting hook 14, for attaching a hoe blade 15 to the handle. The hoe blade 15 and handle 11 are attached together using any suitable means, such as welding. The handle preferably intersects the plane of the hoe blade at an angle of 90 degrees plus or minus 20 degrees within the confines of the bottom, top, and side edges of the blade. The hoe blade 15 needs to be stable enough to withstand the pressures and stresses of working construction material such as concrete. The hoe blade has opposing top 21 and bottom 22 edges, and opposing side edges 23, 24. The top edge 21 is provided with a centrally-disposed top edge recess or opening 25 for accommodating the mounting hook 14 in order to attach the blade 15 to the handle 11 at a more centrally located point below the top edge 21. This enables the top edge 21 of the blade 15 to fully engage the bottom or walls of the container during mixing without interference by the mounting hook 14. Preferably, the top edge 21 is divided into adjacent upper left edge section 21A and upper right edge section 21B which extend outwardly and downwardly from the top edge opening 25 to respective side edges 23, 24 of the blade 15. The side edges 23, 24 extend downwardly and inwardly towards the bottom edge 22 of the blade 15 such that the overall shape of the blade 15 is essentially pentagonal.

According to one embodiment, the bottom edge 22 of the hoe blade 15 is relatively flat or straight for a length of between about 10 and 15 cm. The side edges 23, 24 extend upwardly and outwardly at an angle of between about 100 and 120 degrees relative to the bottom edge 22, and like the bottom straight edge has a flat or straight length extend between about 10 and 15 cm in length. The top edge sections 21A, 21B of the top edge 21 each have a flat or straight edged extending between about 5 and 10 cm in length, and each extends outwardly and downwardly at respective angles of between about 10 and 30 degrees relative to the bottom straight edge 22. The corners 31, 32, 33, and 34, formed at the junction of the top edge 21 and side edges 23, 24 of the blade 15, and at the junction of the side edges 23, 24 and bottom edge 22 of the blade 15, are rounded to protect the walls of the container against scrapes, cuts, rips, puncture, and other damage which typically occurs when mixing using conventional-type sharp corner hoes. The radius defined by each of the top corners 31, 34 of the hoe blade 15 is approximately 0.9 to 2.0 cm, whereas the radius defined by each of the bottom corners 32, 33 of the hoe blade 15 is approximately 2.0 to 3.5 cm. As best indicated in FIG. 4, the top edges 21A, 21B of the blade 15 are each preferably curved backward 35 towards the handle 11 of the mixing hoe 10. This structure creates multiple flow patterns as the mixing hoe 10 is moved back and forth through the material in the container and conducts liquid over or past the blade. The preferred radius of the backward curve 35 is from 1.0 to 2.5 cm.

As best shown in FIGS. 2, 8, 9 and 10, the face of the hoe blade includes a pair of spaced-apart flow ports 36, 37 and 66, 67 and 96, 97 respectively adapted for allowing passage of material through the blades 15, 55, 85 during mixing. Flow deflectors 38, 39 and 68, 69 are located adjacent respective flow ports 36, 37 and 66, 67 and extend outwardly at an angle towards the handle 11 to further agitate material passing through the flow ports 36, 37 and 66, 67 during mixing. The flow deflectors 38, 39 cooperate to direct the flow of material towards the side edges 23, 24 and flow deflectors 66, 67 direct the flow toward the top edge 21 of the hoe blades 15 and 55 respectively as the mixing hoe 10 is moved in a reverse raking motion through the material. The open surface areas of each flow port 36, 37 and 66, 67 are approximately 15 square cm.

Figure 6A:
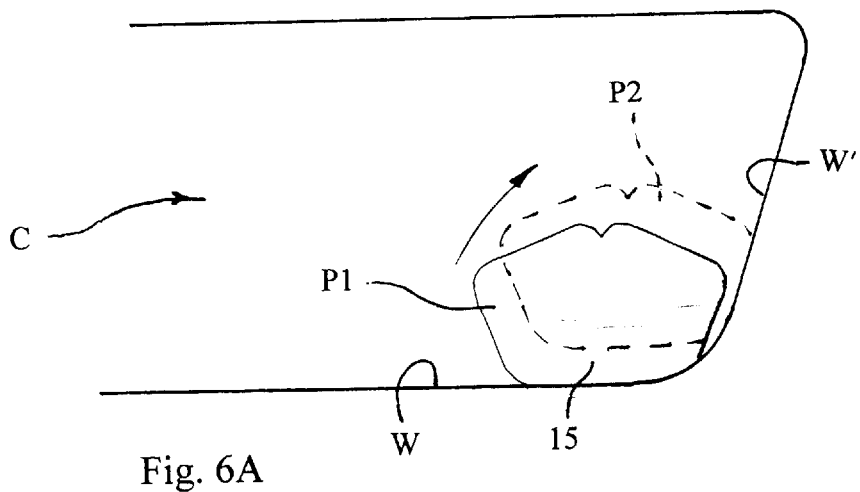
FIGS. 6A, 6B, 6C, and 6D are views depicting use of the mixing hoe in a wheel barrow or open top mixing container.
Figure 6B:
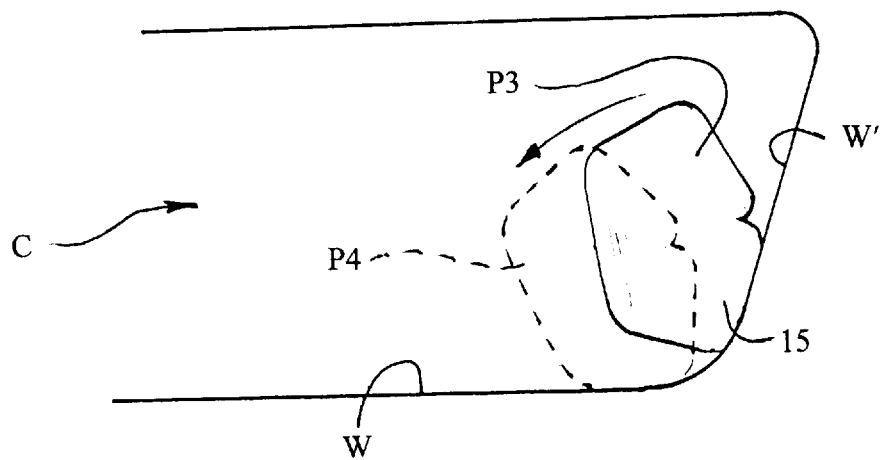
Figure 6C:
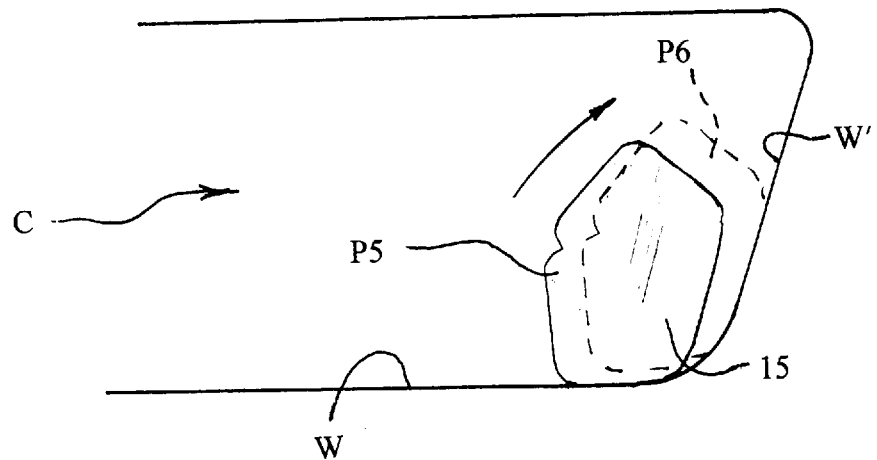
Figure 6D:
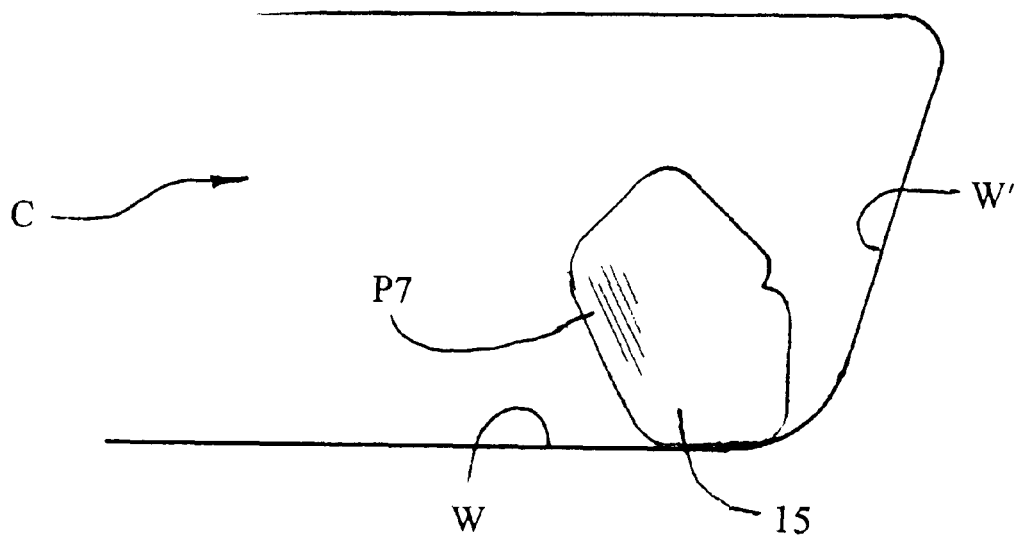

FIGS. 6A, 6B, 6C, and 6D demonstrate use of the mixing hoe. Using the handle 11, the user manipulates the hoe blade 15 to locate one or more of the five top, bottom, and side edges 21A, 21B, 22, 23, 24 against the base "W" and walls "W" of the container "C" to scrape away any material adhering to the base, walls and corners during mixing. The user mixes the material in the container using primarily an alternating forward raking and reverse raking movement and using a stirring motion, and/or using a side to side movement. In FIG. 6A, the hoe blade 15 is rotated from a position "P1" where the bottom edge 22 engages the base "W" of the container "C" to a position "P2" where the side edge 24 engages a side wall "W" of the container "C". In FIG. 6B, the hoe blade 15 is rotated from a position "P3" where the edge section 21B of the top edge 21 engages the side wall "W" of the container "C" to a position "P4" where the side edge 24 engages the base "W" of the container "C". FIG. 6C shows rotation of the hoe blade 15 from a position "P5" where the side edge 23 engages the base "W" of the container "C" to a position "P6" where the bottom edge 22 engages the side wall "W" of the container "C". FIG. 6D shows rotation of the hoe blade 15 to a position "P7" such that the side edge engages the base "W" of the container "C" with the adjacent top edge section extending generally perpendicular to the base "W". In this position "P7", the hoe blade 15 is especially useful in more traditional mixing containers which have a base or one or more side walls extending generally perpendicular to another wall. As a result of its rounded corners 31, 32, 33, and 34 and multiple-angled edges 21A, 21B, 22, 23, and 24, the hoe blade 15 can effectively reach the entire surface area of the base and contoured walls "W" and "W" of the container "C" with little effort by the user, and without damaging the base or walls of the container.

Figure 7:
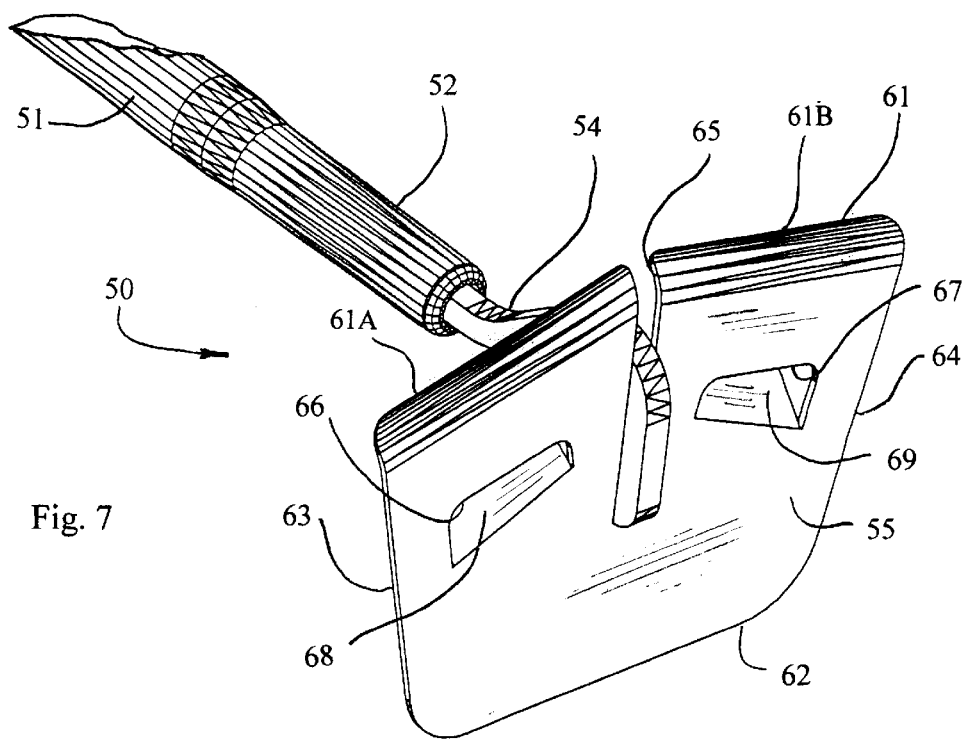
FIG. 7 is a fragmentary front perspective view of a mixing hoe according to a second embodiment of the invention.
Figure 8:
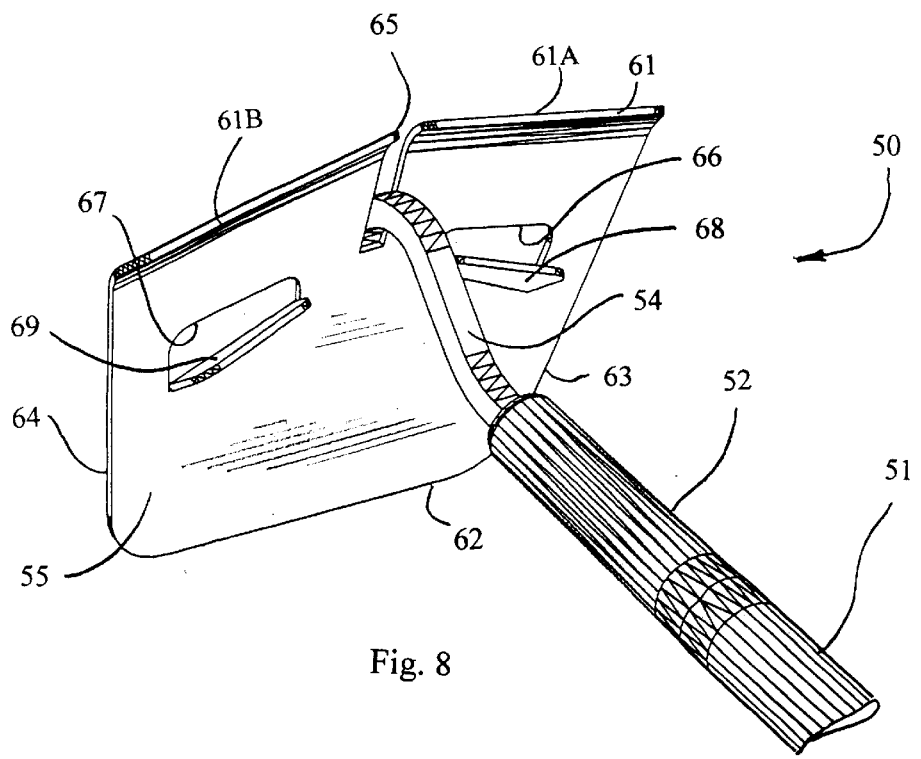
FIG. 8 is a fragmentary rear perspective view of the mixing hoe shown in FIG. 7.

FIGS. 7 and 8 illustrate a modified mixing hoe according to the present invention. As previously described, the mixing hoe 50 includes a standard elongate handle 51 having a free end for being grasped by a user, and a proximal end including a metal ferrule 52 and mounting hook 54 for attaching a hoe blade 55 to the handle 51. The hoe blade 55 has opposing top and bottom edges 61, 62, and opposing side edges 63, 64. The top edge 61 defines a centrally-disposed top edge recess or opening 65 for accommodating the mounting hook 54 in order to attach the blade 55 to the handle 51 at a point below the top edge 61 of the blade 55 and within the confines of the bottom and side edges. The top edge 61 is preferably curved backward towards the handle 51, and is divided into adjacent edge sections 61A and 61B which extend downwardly and outwardly from the top edge opening 65 to respective side edges 63, 64 of the blade 65. The side edges 63, 64 extend downwardly and inwardly towards the bottom edge 62 of the blade 55 such that the overall shape of the blade 55 is essentially pentagonal.

The hoe blade 55 includes a pair of spaced-apart flow ports 66, 67 adapted for passage of material through the blade 55 during mixing. Flow deflectors 68, 69 extend outwardly from the bottom of each flow port 66, 67 towards the handle 51 to further agitate material passing through the flow ports 66, 67 during mixing. The bottom of each flow port 66, 67 is preferably formed parallel to corresponding top edge sections 61A, 61B of the top edge 61 of the hoe blade 55. The flow deflectors 68, 69 direct the flow of material upwardly towards the top edge 61 of the hoe blade 55 as the mixing hoe 50 is moved forward in a reverse raking motion through the material.

A third embodiment of the invention is illustrated in FIG. 9. The mixing hoe 80 includes a standard elongate handle 81 having a free end for being grasped by a user, and a proximal end including a metal ferrule 82 and mounting hook 84 for attaching a hoe blade 85 to the handle 81. The hoe blade 85 has opposing top and bottom edges 91, 92, and opposing side edges 93, 94. The top edge 91 includes a centrally-disposed top edge opening or recess 95 for accommodating the mounting hook 84 in order to attach the blade 85 to the handle 81 at a point below the top edge 91 of the blade 85. The top edges 91A, 91B are preferably curved backward towards the handle 81. The adjacent top edge sections 91A, 91B which extend outwardly and downwardly from the top edge opening 95 to respective side edges 93, 94 of the blade 85. The side edges 93, 94 extend downwardly and inwardly towards bottom edge 92 of the blade 85 such that the overall shape of the blade 85 is essentially pentagonal.

The face of the hoe blade defines a pair of spaced-apart flow ports 96, 97 for passage of material through the blade 85 during mixing. In this embodiment, the angles defining each flow port 96, 97 correspond to those of the top, side and bottom edges 91A, 91B, 92, 93, and 94 of the hoe blade 85. The respective walls of the flow ports can be parallel to edges of the hoe blade. Unlike mixing hoes 10 and 50 the mixing hoe 80 does not include flow deflectors.

Figure 10:
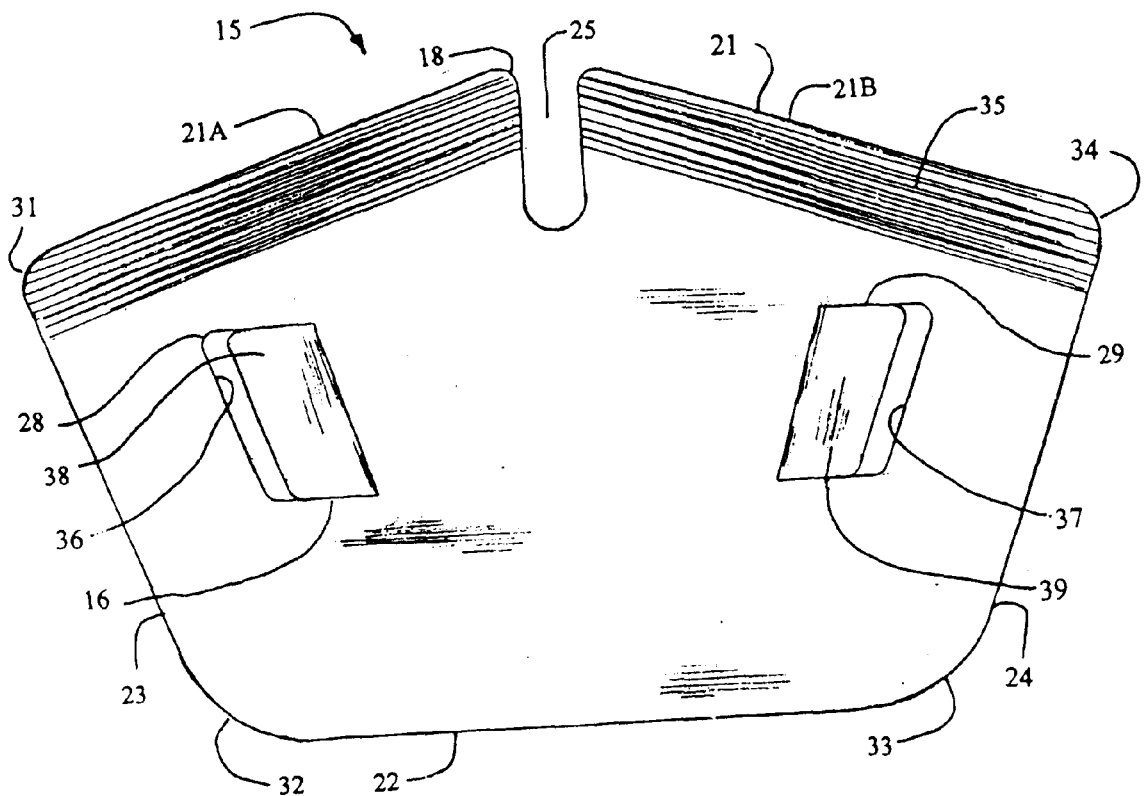
FIG. 10 is a front elevational view of the mixing hoe blade of FIG. 1.

FIG. 10 is a front view of the preferred mixing hoe blade 15, essentially drawn to scale. The blade is preferably made from 3/32 to 5/32 inch plate gauge steel with a 6½ to 8½ inch width and 4½ to 6 inch height. A slot 25, from 3/8 to ½ inch wide is formed along the width center line of the blade and extends from 1½ to 2½ inches into the top of the blade along the center line. The slot intersects the top edges in a radius 18 of about ¼ to ½ inch. The top edge 21A is angled outwardly and downwardly from the center line at from 10 to 30 degrees with a 20 degree angle preferred. The top edges 21A, 21B are bent arcuately backward so that the edges extend backward at an essentially right angle to the plane of the hoe blade back face. This configuration diverts the flow of liquid downward at opposing angles toward the dry unmixed material to accelerate mixing, particularly at the start. The top edge intersects the left edge 23 of the blade at preferably a 90 degree angle. This will enable the top edge 21A and side edge 23 to scrape containers that have bottoms and walls that intersect at 90 degree angles. The same structure is provided with the top right edge 21B and right edge 24. The juncture of the sides and tops 31, 34 are formed by a radius of from ¼ to ½ inch. The base of lower edge 22 intersects the side edges 23, 24 at an angle of from 100 to 120 degrees. The base 22 meets the sides 23, 24 in a radius of ¾ to 1¼ inch to accommodate container angular and arcuate intersecting walls and base. The blade is provided with flow ports 36, 37 and flow deflectors 38, 39. The flow ports are preferably formed with side walls parallel to side edges 23, 24 and with top 29 and bottom 16 walls parallel to the bottom blade edge 22. The side walls 36, 37 meet the top 29 and bottom 16 walls at a radius 28 of from ¼ to ½ inch. The flow ports are preferably formed beginning from ⅞ to 1½ inches in from the side edges. The ports have a width of ⅝ to 1 inch and a height of from 1¼ to 2 inches. The material from the ports has one inner side remaining attached after the other three sides are cut, are bent backwardly toward the handle at an angle of 15 to 35 degrees to form flow deflectors 38, 39 that open toward the sides of the blade. The flow deflectors provide a pressure relief, reduce sloshing of liquid as the blade is drawn along the mixing container in close proximity to the sides, and provide maximum surface area for the mixing blade while deflecting or breaking up clots to keep them from blocking the flow ports. The passage opening to the outer sides increases efficiency and back flow. The blade edges 21A, 21B, 22, 23, 24 are blunt so as to not scrape or cut into the container material. The edges can be beveled or rounded slightly to remove burrs or sharp corners. The flat edges are all formed around the handle point of attachment to balance the forces no matter which side of the blade is being used for mixing.

It is believed that the construction, operation and advantages of this invention will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

What is claimed is:

1. A mixing hoe comprising:

a mixing blade formed from an essentially flat planar material having a front side and a back side with an upper edge area, a left side edge, a right side edge, and a bottom edge;

said mixing blade upper edge area having a centrally located recess extending into said mixing blade for attachment of a handle in between said upper edge area, said left side edge, said right side edge and said bottom edge;

said central recess dividing said upper edge area into a left upper edge and a right upper edge;

said left upper edge including a flat edge tapering outwardly and downwardly from said central recess, terminating in an outer extreme, to form an upper left scraping edge;

said right upper edge including a flat edge tapering outwardly and downwardly from said central recess, terminating in an outer extreme, to form an upper right scraping edge;

said upper left scraping edge outer extreme terminating at an upper extreme of said mixing blade left side edge;

said mixing blade left side edge including a flat edge tapering downwardly and inwardly from said upper left scraping edge outer extreme to form a left side scraping edge;

said upper right scraping edge outer extreme terminating at an upper extreme of said mixing blade right side edge;

said mixing blade right side edge including a flat edge tapering downwardly and inwardly from said upper right scraping edge outer extreme to form a right side scraping edge;

said mixing blade bottom edge left side terminates at a lower extreme of said left side edge and said mixing blade bottom edge right side terminates at a lower extreme of said right side edge forming a bottom scraping edge including a flat edge such that any one of said scraping blade bottom scraping edge or right side scraping edge or left side scraping edge or left upper scraping edge or right upper scraping edge can be used for scraping and mixing by rotation of said mixing blade.

2. A mixing hoe as in claim 1 wherein:

said left upper scraping edge and said left side scraping edge extended toward each other would intersect within 5 degrees of forming a right angle for scraping container walls that intersect at a right angle;

said right upper scraping edge and said right side scraping edge extended toward each other would intersect within 5 degrees of forming a right angle for scraping container walls that intersect at a right angle.

3. A mixing hoe as in claim 1 wherein:

said left upper scraping edge is bent backward to form a liquid flow control over said left upper scraping edge;

said right upper scraping edge is bent backward to form a liquid flow control over said right upper scraping edge.

4. A mixing hoe as in claim 3 wherein:

said left upper scraping edge is bent backward ninety degrees with respect to the plane of said mixing blade;

said right upper scraping edge is bent backward ninety degrees with respect to the plane of said mixing blade.

5. A mixing hoe as in claim 1 wherein:

the intersection of said left upper scraping edge outer extreme and said left side scraper edge upper extreme is formed in an arcuate configuration;

the intersection of said right upper scraping edge outer extreme and said right side scraping edge upper extreme is formed in an arcuate configuration;

the intersection of said left side scraping edge lower extreme and said bottom edge left side is formed in an arcuate configuration;

the intersection of said right side scraping edge lower extreme and said bottom edge right side is formed in an arcuate configuration;

said arcuate configuration permits scraping of container walls that meet in an arcuate configuration.

6. A mixing hoe as in claim 1 wherein:

said left upper scraping edge, said right upper scraping edge, said left side scraping edge, said right side scraping edge, and said bottom scraping edge are all blunt.

7. A mixing hoe as in claim 1 wherein:

said left upper scraping edge slopes downwardly and outwardly at twenty degrees plus or minus five degrees with respect to said bottom scraping flat edge;

said right upper scraping edge slopes downwardly and outwardly at twenty degrees, plus or minus five degrees with respect to said bottom scraping flat edge;

said left side scraping edge slopes upwardly and outwardly at one hundred and ten degrees plus or minus five degrees with respect to said bottom scraping flat edge;

said right side scraping edge slopes upwardly and outwardly at one hundred and ten degrees plus or minus five degrees with respect to said bottom scraping flat edge.

8. A mixing hoe as in claim 2 wherein:

said left upper scraping edge is bent backward to form a liquid flow control over said left upper scraping edge;

said right upper scraping edge is bent backward to form a liquid flow control over said right upper scraping edge.

9. A mixing hoe as in claim 1 wherein:

said mixing blade is provided with flow ports for flow through of material being mixed.

10. A mixing hoe as in claim 9 wherein:

flow deflectors extend outwardly from each said flow port for further agitating material passing through said flow ports.

11. A mixing hoe as in claim 1 including:

a handle secured to said back side of said flat planar mixing blade at an angle of ninety degree plus or minus twenty degree for pushing and pulling said mixing blade essentially perpendicularly through materials to be mixed.

12. A mixing hoe wherein:

said mixing hoe has a flat planar mixing blade with an upper right edge and an upper left edge and a left side edge and a right side edge, and a bottom edge, and a front side and a back side;

said bottom edge includes a flat edge area;

said right upper edge and said left upper edge include flat edges that extend outwardly and downwardly from a central upper location;

said right upper edge and said left upper edge are bent backwardly toward said mixing blade back side to form arcuate guide areas above said upper right edge and said upper left edge;

said mixing blade is provided with flow ports for flow through of material being mixed;

flow deflectors extend outwardly on the back side of said mixing blade for added agitation of the material being mixed.

13. A hoe as in claim 12 wherein:

said flow ports include a left flow port and a right flow port;

said left flow port and said right flow port each have side walls and upper and lower walls;

said left flow port side walls are formed parallel to said mixing hoe left side edge;

said right flow port side walls are formed parallel to said mixing hoe right side edge;

said left flow port and said right flow port upper and lower walls are formed parallel to said mixing hoe bottom scraping flat edge;

said flow deflectors are bent backward from said mixing hoe blade back side at areas where said flow ports are formed.

14. A hoe as in claim 12 wherein:

said intersections of said upper right blade edge and said right side edge, said upper left blade edge and said left side edge, said left side edge and said bottom edge, and said right side edge and said bottom edge, are all rounded to remove sharp corners that would scar, cut or gouge mixing containers.

15. A hoe as in claim 12 wherein:

said upper right edge extended and said right side edge extended meet within 5 degrees of forming a right angle;

said upper left edge extended and said left side edge extended meet within 5 degrees of forming a right angle.

16. A hoe as in claim 15 wherein:

said left side edge extended and said bottom edge meet extended within 5 degrees of forming a 110 degree angle;

said right side edge extended and said bottom edge extended meet within 5 degrees of forming a 110 degree angle.

17. A mixing hoe wherein:

said mixing hoe has a flat planar mixing blade having a front side and a back side with an upper right edge and an upper left edge and a right side edge and a left side edge and a bottom edge with each said edge having a flat area for providing 360 degree mixing by rotation of said mixing hoe blade;

said upper right edge and said right side edge meet in an arcuate configuration, and said right edge and said bottom edge meet in an arcuate configuration and said bottom edge and said left side edge meet in an arcuate configuration, and said left side edge and said left upper edge meet in an arcuate configuration, to preclude cutting, gouging or scraping a mixing container;

said arcuate configuration between said bottom edge and said left side edge and between said bottom edge and said right side edge are a radius of from 2.0 to 3.5 cm;

said arcuate configuration between said left side edge and said left upper edge and between said right side edge and said right upper edge are a radius of from 0.9 to 2.0 cm;

said right upper edge flat area and said left upper edge flat area extend from 5 to 10 cm;

said left side edge and said right side edge and said bottom edge flat areas extend from 10 to 15 cm;

said right upper edge extended and said right side edge extended meet at a ninety degree angle plus or minus five degrees and said left upper edge extended and said left side edge extended meet at a ninety degree angle plus or minus five degrees;

said left side edge extended and said bottom edge extended meet at an angle of one hundred ten degrees plus or minus five degrees and said bottom edge extended and said right side edge extended meet at an angle of one hundred ten degrees plus or minus five degrees so as to be able to mix materials in different size soft material containers having different slope sides and different arcuate meeting edges.

18. A mixing hoe as in claim 17 including:

a handle attached to said mixing blade back side between said left and right upper edges and said bottom edge and between and said left and right side edges, for rotating said mixing blade and for pushing and pulling said mixing blade in the plane perpendicular to said mixing blade, flat planar front and back sides.

19. A mixing hoe as in claim 17 including:

flow ports in said mixing blade for passage of material being mixed;

flow deflectors extending outwardly from each said flow port for additional agitation of material flowing through said flow ports.

20. A mixing hoe as in claim 19 wherein:

said flow ports provide an open area of from 12 to 18 sq. cm.;

said flow deflectors are angled to control the direction material flows after passing through said flow ports.

* * * * *